US009266419B2

(12) United States Patent
Iwase et al.

(10) Patent No.: US 9,266,419 B2
(45) Date of Patent: Feb. 23, 2016

(54) VEHICLE DRIVE DEVICE

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Mikio Iwase, Anjo (JP); Daiki Suyama, Okazaki (JP); Naoya Jinnai, Anjo (JP); Tatsuya Okishima, Chiryu (JP); Kensuke Wada, Anjo (JP); Yuji Inoue, Nisshin (JP); Yukihiko Ideshio, Nisshin (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/382,914

(22) PCT Filed: Mar. 28, 2013

(86) PCT No.: PCT/JP2013/059312
§ 371 (c)(1),
(2) Date: Sep. 4, 2014

(87) PCT Pub. No.: WO2013/157374
PCT Pub. Date: Oct. 24, 2013

(65) Prior Publication Data
US 2015/0027273 A1    Jan. 29, 2015

(30) Foreign Application Priority Data

Apr. 20, 2012    (JP) ................................. 2012-097131

(51) Int. Cl.
| | |
|---|---|
| *F16H 57/02* | (2012.01) |
| *B60K 6/405* | (2007.10) |
| *B60K 6/26* | (2007.10) |

(Continued)

(52) U.S. Cl.
CPC . *B60K 6/405* (2013.01); *B60K 6/26* (2013.01); *B60K 6/36* (2013.01); *B60K 6/387* (2013.01); *B60K 6/48* (2013.01); *B60K 6/54* (2013.01); *B60K 6/547* (2013.01); *H02K 5/225* (2013.01); *H02K 7/006* (2013.01); *H02K 9/19* (2013.01);

(Continued)

(58) Field of Classification Search
CPC .. B60K 6/48; B60K 2006/4825; F16H 3/089; F16H 59/02; F16H 57/02; F16H 57/0423
USPC ............. 74/661, 665 A, 665 D, 665 E, 606 R
See application file for complete search history.

(56) References Cited

U.S. PATENT DOCUMENTS

| | | | | |
|---|---|---|---|---|
| 6,018,198 | A * | 1/2000 | Tsuzuki et al. | 290/17 |
| 6,342,027 | B1 * | 1/2002 | Suzuki | 477/5 |
| 8,506,449 | B2 * | 8/2013 | Yoshida et al. | 477/5 |
| 2001/0024994 | A1 | 9/2001 | Sugano | |
| 2008/0064560 | A1 * | 3/2008 | Popp et al. | 477/5 |

(Continued)

FOREIGN PATENT DOCUMENTS

| | | |
|---|---|---|
| JP | A-2001-78380 | 3/2001 |
| JP | A-2001-260674 | 9/2001 |

(Continued)

*Primary Examiner* — Ha D Ho
(74) *Attorney, Agent, or Firm* — Oliff PLC

(57) ABSTRACT

A vehicle drive device in which a friction engagement device, a rotary electric machine, and a speed change device are provided on a power transfer path that connects between an input member drivably coupled to an internal combustion engine and an output member drivably coupled to wheels, the elements provided in this order from the input member side.

3 Claims, 6 Drawing Sheets

(51) Int. Cl.
*B60K 6/387* (2007.10)
*B60K 6/48* (2007.10)
*H02K 5/22* (2006.01)
*H02K 7/00* (2006.01)
*H02K 9/19* (2006.01)
*B60K 6/36* (2007.10)
*B60K 6/54* (2007.10)
*B60K 6/547* (2007.10)

(52) U.S. Cl.
CPC ........ *B60Y 2400/426* (2013.01); *Y02T 10/6221* (2013.01); *Y10T 74/19056* (2015.01)

(56) References Cited

U.S. PATENT DOCUMENTS

2011/0115316 A1  5/2011  Isogai et al.
2011/0118078 A1* 5/2011  Kraska et al. .................... 477/5

FOREIGN PATENT DOCUMENTS

| JP | A-2007-336675 | 12/2007 |
| JP | A-2011-109839 | 6/2011 |
| JP | A-2012-55039 | 3/2012 |

* cited by examiner

VEHICLE DRIVE DEVICE

TECHNICAL FIELD

The present invention relates to a vehicle drive device in which a friction engagement device, a rotary electric machine, and a speed change device are provided on a power transfer path that connects between an input member drivably coupled to an internal combustion engine and an output member drivably coupled to wheels such that the friction engagement device, and the rotary electric machine, and the speed change device are arranged in this order from an input member side.

BACKGROUND ART

An example of the vehicle drive device described above is described in Japanese Patent Application Publication No, 2012-55039 (JP 2012-55039 A) (Patent Document 1). The device according to Patent Document 1 includes a rotary electric machine [electric motor 1] and a friction engagement device [clutch device 3] provided in a housing portion [motor cover 12] that has a support wall [fixed wall 111] disposed between the rotary electric machine and a speed change device [transmission 4]. A supply oil passage [oil passage 111a] configured to supply oil to the friction engagement device is formed in the support wall. A sensor stator [detector 152] of a rotation sensor [resolver 15] is fixed to a surface of the support wall on the rotary electric machine side in the axial direction.

In general, a control device that controls the vehicle drive device described above receives and outputs a variety of control signals to control operation of various components of the vehicle drive device. For example, the control device outputs current and voltage command signals to a stator coil of the rotary electric machine, receives a signal output from the rotation sensor which detects rotation of a rotor of the rotary electric machine, and outputs a command signal to a hydraulic control device that controls the state of engagement of the friction engagement device. In order to appropriately receive and output such a variety of control signals, it is necessary to appropriately connect the control device, a stator of the rotary electric machine, the rotation sensor, and the hydraulic control device to each other via an electric wiring member.

In this case, a reduction in size of the entire drive device may be hindered if the electric wiring member are not appropriately routed to connect the control device which is external and the rotary electric machine and the rotation sensor disposed in the housing portion. In this respect, Patent Document 1 describes only the arrangement of the rotation sensor in the housing portion, and does not describe a specific method to connect between the external control device and the rotation sensor. In addition, Patent Document 1 does not clearly describe the arrangement of the hydraulic control device, and as a matter of course does not describe a specific method to connect between the external control device and the hydraulic control device.

Japanese Patent Application Publication No. 2011-109839 (JP 2011-109839 A) (Patent Document 2) also discloses a vehicle drive device with a similar configuration. However, Patent Document 2 also does not describe a specific method to connect between the control device which is external and the rotation sensor and the hydraulic control device. In the device according to Patent Document 2, an electric wiring member [coil wiring member 36] that extends from the stator [stator 31] of the rotary electric machine [electric motor 3] is connected to a terminal block [external connection terminal block 34] provided at the circumferential wall of the housing portion [motor housing 300] by a bolt from the radially outer side. Such a configuration requires that a space for operating the bolt should be secured on the radially outer side of the circumferential wall of the housing portion, which may degrade the mountability of the drive device on a vehicle.

RELATED-ART DOCUMENTS

Patent Documents

[Patent Document 1] Japanese Patent Application Publication No. 2012-55039 (JP 2012-55039 A)
[Patent Document 2] Japanese Patent Application Publication No. 2011-109839 (JP 2011-109839 A)

SUMMARY OF THE INVENTION

Problem to be Solved by the Invention

In view of the foregoing, it is desirable to provide a vehicle drive device in which an external device such as a control device, for example, and a stator of a rotary electric machine, a rotation sensor, and a hydraulic control device can be appropriately electrically connected and an increase in overall size is suppressed.

Means for Solving the Problem

The present invention provides a vehicle drive device in which a friction engagement device, a rotary electric machine, and a speed change device are provided on a power transfer path that connects between an input member drivably coupled to an internal combustion engine and an output member drivably coupled to wheels, the friction engagement device, the rotary electric machine, and the speed change device being arranged in this order from the input member side, including: a housing portion that has a circumferential wall that surrounds a radially outer side of the rotary electric machine and the friction engagement device, and a support wall that extends in a radial direction at allocation between the rotary electric machine and the speed change device in an axial direction; a hydraulic control device fixed to the housing portion; a supply oil passage formed in the support wall to supply oil from the hydraulic control device to the friction engagement device; and a rotation sensor that has a sensor stator fixed to the support wall and that detects rotation of a rotor with respect to a stator of the rotary electric machine. In the vehicle drive device, the circumferential wall has a first through hole and a second through hole that penetrate the circumferential wall in the radial direction; a first wiring member that extends from the stator is connected to a first terminal of a terminal block provided in the first through hole; a second wiring member that extends into the housing portion from an outside through the second through hole is fixed to a non-formed region which is a region of the support wall in which the supply oil passage is not formed, and includes a first connection wiring portion and a second connection wiring portion branched from each other; and the first connection wiring portion is connected to a second terminal of the rotation sensor, and the second connection wiring portion is connected to a third terminal of the hydraulic control device.

In the present invention, the term "drivably coupled" means a state in which two rotary elements are coupled to each other in such a manner that enables transfer of a drive force (a synonym for torque). The concept includes a state in which the two rotary elements are coupled so as to rotate together with each other, and a state in which the two rotary elements are coupled via one or more transmission members in such a manner that enables transfer of a drive force. Such transmission members may include various members that transfer rotation at an equal speed or a changed speed (such as a shaft, a gear mechanism, and a belt), and may include engagement devices that selectively transfer rotation and a drive force (such as a friction engagement device and a meshing-type engagement device).

The term "rotary electric machine" refers to any of a motor (electric motor), a generator (electric generator), and a motor generator that functions both as a motor and as a generator as necessary.

According to the characteristic configuration, it is possible to electrically connect an external device such as a control device, for example, and the stator of the rotary electric machine, the rotation sensor, and the hydraulic control device in the housing portion via the first through hole and the second through hole formed in the circumferential wall of the housing portion. At this time, the first through hole is provided with the terminal block, and the stator of the rotary electric machine is connected to the first terminal of the terminal block via the first wiring member. Hence, the external device and the stator can be stably connected to each other. In addition, the second wiring member which extends into the housing portion through the second through hole is fixed to the support wall. In general, some gap (clearance) is secured between the support wall and the stator in the axial direction. Thus, the second wiring member can be routed using such a gap without requiring a special space. Hence, an increase in size of the entire vehicle drive device can be suppressed. In this event, the dimension in the axial direction can be suppressed to a minimum by adopting a configuration in which the supply oil passage is formed in a portion of the support wall that is raised to a rotary electric machine side, for example, and in which the second wiring member is fixed to the non-formed region which is not raised (in which the supply oil passage is not formed).

Here, preferably, the housing portion has a first housing space formed on a radially inner side of the circumferential wall to house the rotary electric machine and the friction engagement device, a second housing space that houses the hydraulic control device, and a communication hole that communicates between the first housing space and the second housing space, and the second connection wiring portion is introduced from the first housing space to the second housing space through the communication hole to be connected to the third terminal in the second housing space.

According to the configuration, oil discharged for pressure regulation etc. from the hydraulic control device housed in the second housing space can be fed to the first housing space via the communication hole. This makes it possible to suppress a steep rise in hydraulic pressure in the second housing space due to the pressure of oil discharged from the hydraulic control device. Hence, the controllability of the hydraulic control device can be prevented from being unfavorably affected. In addition, the communication hole provided for such a purpose can be utilized to introduce the second connection wiring portion, which is a portion of the second wiring member that is branched from the first connection wiring portion, from the first housing space to the second housing space. Hence, an increase in size of the entire vehicle drive device can be suppressed by connecting the external device and the hydraulic control device to each other with a simple configuration and good controllability of the hydraulic control device is maintained.

Preferably, the vehicle drive device further includes an oil supply portion that supplies oil to the hydraulic control device from the speed change device side in the axial direction; the communication hole is formed on an opposite side of a fixation portion of the housing portion to which the hydraulic control device is fixed from the speed change device side in the axial direction; and the circumferential wall is formed to have a radial gap between an outer peripheral surface of the stator and the circumferential wall in a communication region which is a circumferential region in which the communication hole is formed.

According to the configuration, the communication hole is formed on the opposite side of the fixation portion of the housing portion to which the hydraulic control device is fixed from the speed change device side in the axial direction. Thus, the communication hole can be provided without hindering an appropriate arrangement of the oil supply portion. In addition, the second connection wiring portion can be appropriately introduced to the second housing space through the radial gap formed between the communication region in the circumferential wall of the housing portion and the outer peripheral surface of the stator.

Preferably, the vehicle drive device further includes a cover member fixed to the housing portion from an opposite side of the rotary electric machine from the support wall side in the axial direction; the first wiring member extends from a coil end portion of the stator on the cover member side in the axial direction; and a fourth terminal of the first wiring member and the first terminal are connected to each other by a fastening member inserted in the axial direction.

According to the configuration, an opening portion in the axial direction can be formed on the opposite side of the rotary electric machine from the support wall side in the axial direction with the housing portion and the cover member removed from each other. Hence, the first wiring member which extends from the coil end portion on the cover member side (the opening portion side) and the first terminal of the terminal block can be easily connected to each other. In particular, the fourth terminal of the first wiring member and the first terminal of the terminal block are connected to each other by the fastening member inserted in the axial direction. Thus, it is not necessary to provide a space for operating the fastening member on the radially outer side with respect to the circumferential wall of the housing portion. Hence, it is possible to secure good mountability of the vehicle drive device on the vehicle and to suppress an increase in size of the entire vehicle drive device even if consideration is given to the work of connecting an external device and the stator of the rotary electric machine to each other.

MODES FOR CARRYING OUT THE INVENTION

A vehicle drive device according to an embodiment of the present invention will be described with reference to the drawings. A vehicle drive device 1 according to the embodiment is a vehicle drive device (hybrid vehicle drive device)

configured to drive a vehicle (hybrid vehicle) that includes both an internal combustion engine E and a rotary electric machine MG as drive force sources for wheels W. Specifically, the vehicle drive device 1 is constituted as a drive device for a one-motor parallel type hybrid vehicle.

In the following description, unless specifically differentiated, the "axial direction L", the "radial direction R", and the "circumferential direction" are defined with reference to the rotational axis of the rotary electric machine MG (an axis X illustrated in FIG. 2). The "first axial direction L1" indicates the direction from a rotary electric machine MG side toward a speed change device SC along the axial direction L (toward the right in FIG. 2). The "second axial direction L2" indicates the direction opposite to the first axial direction L1. The "radially inward direction R1" indicates the direction toward an inner side in the radial direction R. The "radially outward direction R2" indicates the direction toward an outer side in the radial direction R. Directions for each member indicate directions with that member assembled to the vehicle drive device 1. Terms related to the direction, the position, etc. of each member are used as concepts including a difference due to a manufacturing error.

1. Overall Configuration of Vehicle Drive Device

Figure 1:
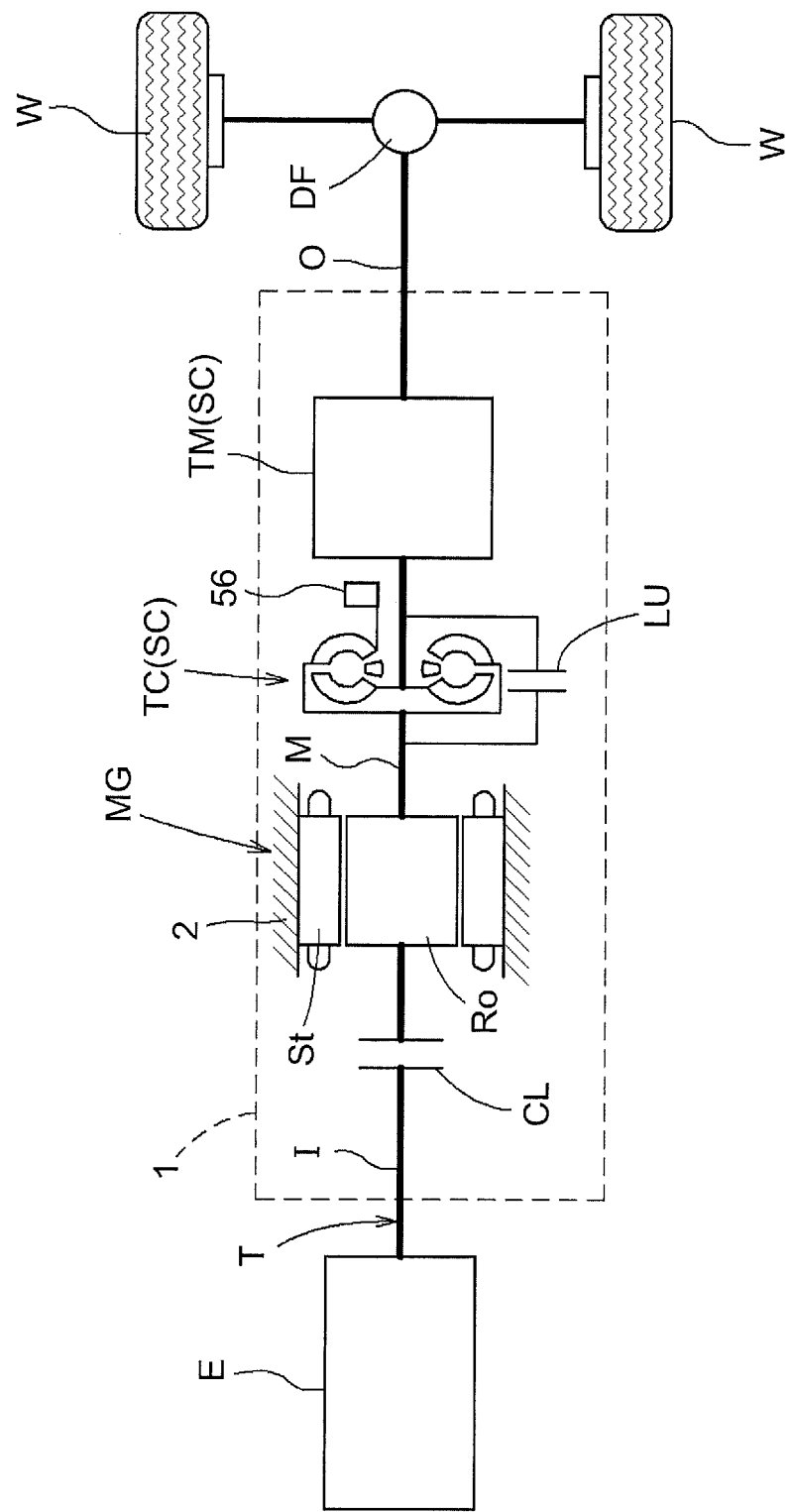
FIG. 1 is a schematic diagram illustrating a schematic configuration of a vehicle drive device.

The overall configuration of the vehicle drive device 1 according to the embodiment will be described. As illustrated in FIG. 1, the vehicle drive device 1 includes an input shaft I drivably coupled to the internal combustion engine E, a friction engagement device CL, the rotary electric machine MG, the speed change device SC, and an output shaft O drivably coupled to the wheels W. The friction engagement device CL, the rotary electric machine MG, and the speed change device SC are provided on a power transfer path T that connects between the input shaft I and the output shaft O in the described order from the input shaft I side. These members are housed in a case (drive device case) 2.

The internal combustion engine E is a motor (such as a gasoline engine) driven by combusting fuel inside the engine to take out power. In the embodiment, the input shaft I is drivably coupled to an output shaft (such as a crankshaft) of the internal combustion engine E via a damper 11 (see FIG. 2). The input shaft I may be drivably coupled to the output shaft of the internal combustion engine E not via the damper 11. In the embodiment, the input shaft I corresponds to the "input member" according to the present invention.

The friction engagement device CL is provided between the input shaft I and the rotary electric machine MG (rotor member 31) on the power transfer path T. The friction engagement device CL is capable of releasing drivable coupling between the input shaft I drivably coupled to the internal combustion engine E and an intermediate shaft M drivably coupled to the rotary electric machine MG. This allows the friction engagement device CL to function as an internal combustion engine-disconnecting engagement device that disconnects the internal combustion engine E from the wheels W.

In the embodiment, the speed change device SC includes a torque converter TC and a speed change mechanism TM. The torque converter TC and the speed change mechanism TM are provided on the power transfer path T on the wheels W side with respect to the rotary electric machine MG in the described order from the rotary electric machine MG side. A lock-up clutch LU is provided along with the torque converter TC. The speed change mechanism TM is configured as a mechanism (such as a stepped automatic speed change mechanism or a continuously variable automatic speed change mechanism) capable of changing the speed ratio in a stepwise or continuous manner. The speed change device SC changes the speed of rotation of the intermediate shaft M with a predetermined speed ratio to transfer the rotation to the output shaft O. In the embodiment, the output shaft O corresponds to the "output member" according to the present invention.

The output shaft O is drivably coupled to the two, left and right, wheels W via a differential gear device DF. Rotation and torque transferred to the output shaft O is distributed by the differential gear device DF and transferred to the two wheels W. This allows the vehicle drive device 1 to transfer torque of one or both of the internal combustion engine E and the rotary electric machine MG to the wheels W and to cause the vehicle to travel.

Figure 2:
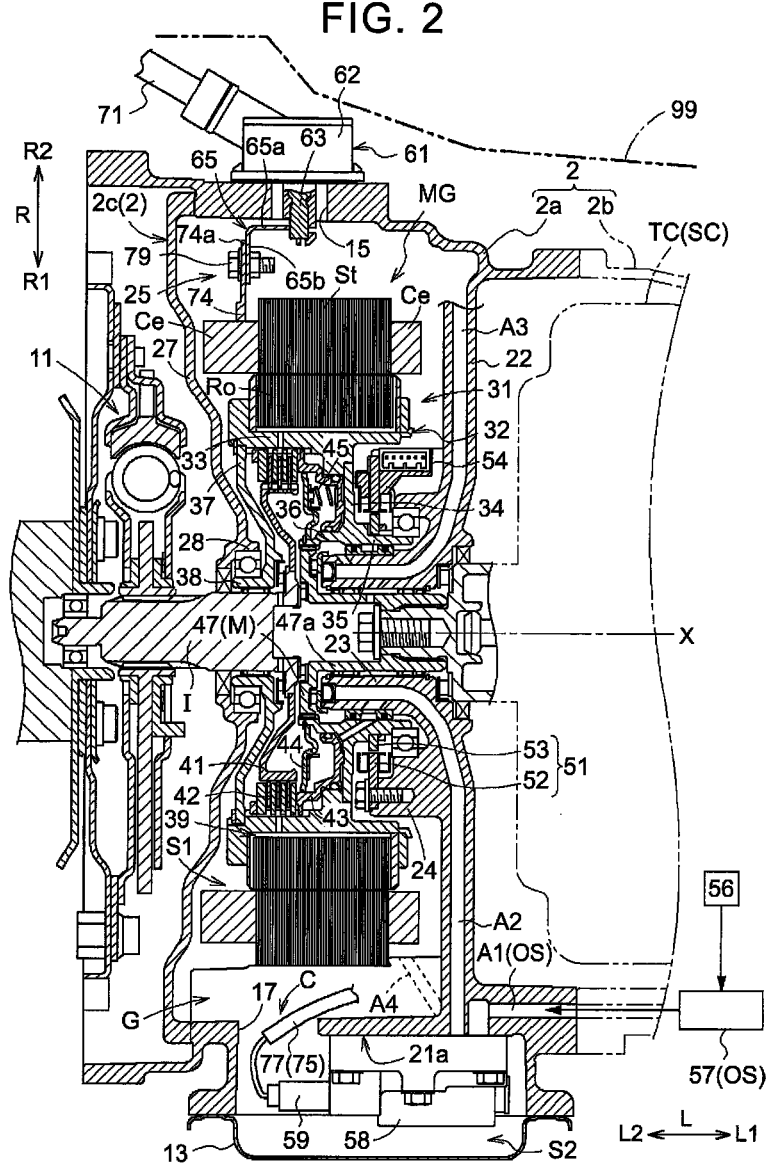
FIG. 2 is a partial sectional view of the vehicle drive device.

In the embodiment, as illustrated in FIG. 2, the input shaft I, the friction engagement device CL, the rotary electric machine MG, the intermediate shaft M, and the torque converter TC are all disposed on the axis X. The speed change mechanism TM and the output shaft O are also disposed on the axis X. Thus, the vehicle drive device 1 has a single-axis configuration which is suitable for the vehicle drive device to be mounted on FR (Front Engine Rear Drive) vehicles.

2. Configuration of Various Components of Drive Device

Figure 3:
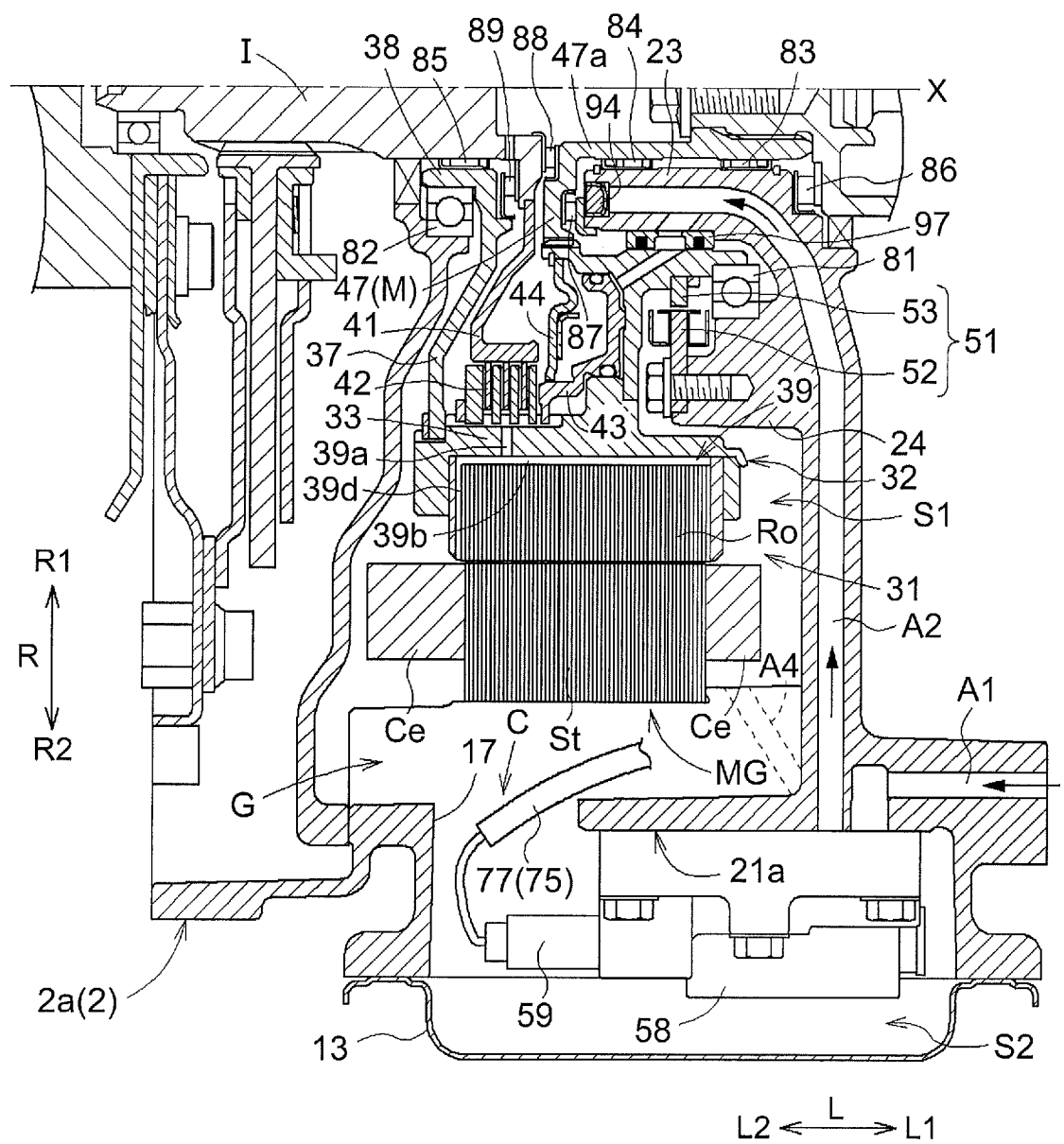
FIG. 3 is a partial enlarged view of FIG. 2.
Figure 4:
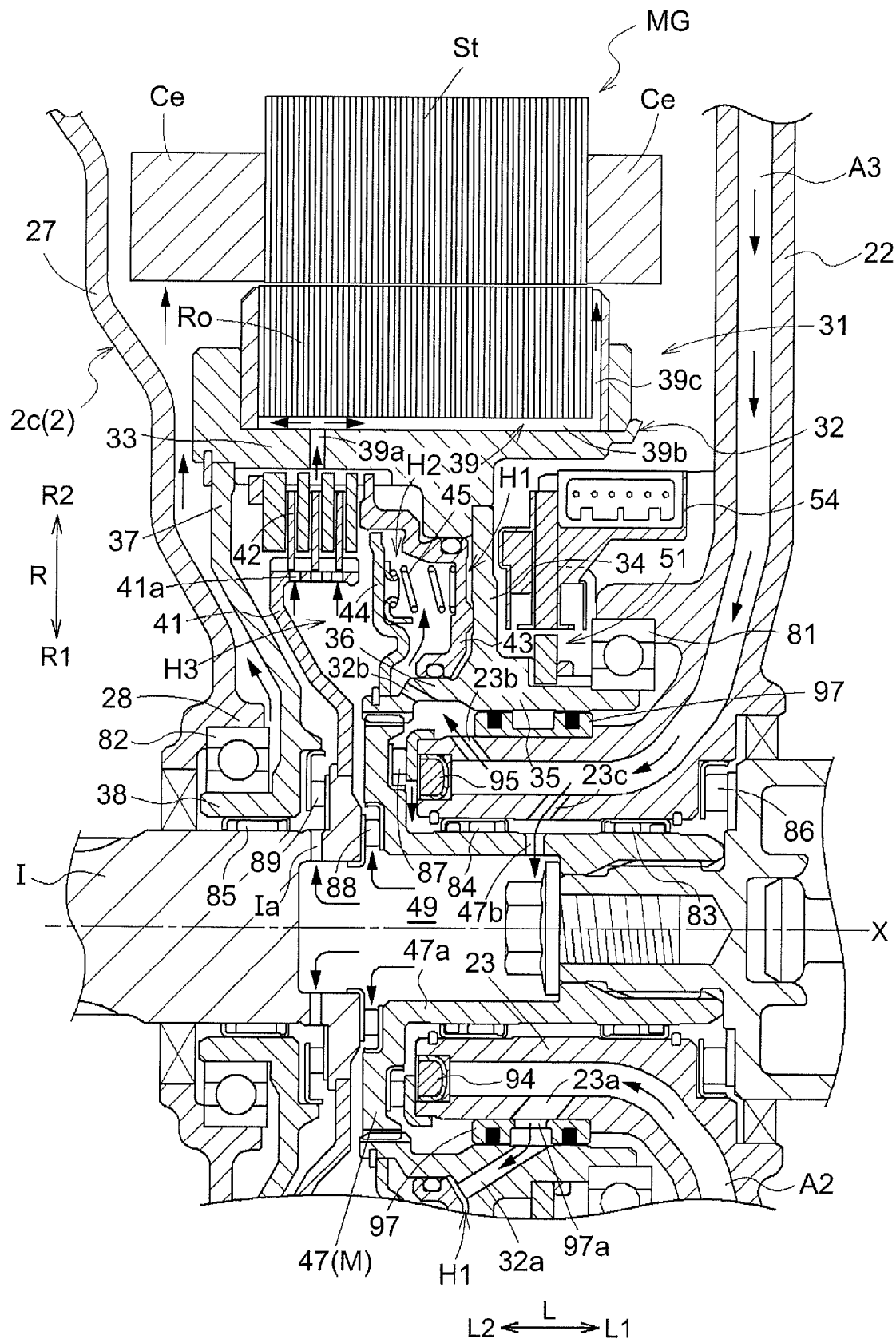
FIG. 4 is a partial enlarged view of FIG. 2.

Next, the configuration of various components of the vehicle drive device 1 will be described mainly with reference to FIGS. 2 to 4. FIG. 2 is a sectional view of a part of the vehicle drive device 1 taken along a plane including the axis X. FIGS. 3 and 4 are each a partial enlarged view of FIG. 2.

The case 2 houses the rotary electric machine MG, the friction engagement device CL, the torque converter TC, and the speed change mechanism TM. As illustrated in FIG. 2, the case 2 includes a first case portion 2a, a second case portion 2b, and a cover member 2c. In the embodiment, such components are formed separately. The first case portion 2a houses the rotary electric machine MG and the friction engagement device CL. The second case portion 2b houses the torque converter TC and the speed change mechanism TM. The second case portion 2b is joined to the first case portion 2a on the first axial direction L1 side. The cover member 2c is fixed to the first case portion 2a from the second axial direction L2 side, which is the opposite side of the rotary electric machine MG from a first support wall 22 in the axial direction L, so as to cover an opening portion 25 of the first case portion 2a on the second axial direction L2 side. In the embodiment, the first case portion 2a corresponds to the housing portion according to the present invention.

The first case portion 2a has a circumferential wall 21 and the first support wall 22. In the embodiment, such components are formed integrally. The circumferential wall 21 is formed to surround the rotary electric machine MG and the friction engagement device CL from the radially outward direction R2 side over the entire circumference. A first housing space S1 in which the rotary electric machine MG and the friction engagement device CL are housed is formed on the radially inward direction R1 side with respect to the circumferential wall 21. In addition, a second housing space S2 in which a second hydraulic control device 58 is housed is formed on the radially outward direction R2 side with respect to the circumferential wall 21. The second housing space S2 is defined by the circumferential wall 21 and a second oil pan 13 fixed to the circumferential wall 21. Specifically, the second housing space S2 is a space surrounded by an outer surface (here, the lower surface) of the circumferential wall 21 and the second oil pan 13 fixed to a seat portion provided on the circumferential wall 21, and tightly sealed from the outside. A fixation portion 21a formed flatly is provided on the radially outward direction R2 side of the circumferential wall 21. The second hydraulic control device 58 is fixed to the fixation portion 21a. In addition, the circumferential wall 21 has a first through hole 15, a second through hole 16 (see FIG. 6), and a communication hole 17 that that penetrate through the circumferential wall 21 in the radial direction R. These components will be discussed in detail later.

The first support wall 22 is formed so as to extend in the radial direction R at a location between the rotary electric machine MG and the speed change device SC (here, the torque converter TC) in the axial direction L. In the embodiment, the first support wall 22 corresponds to the "support wall" according to the present invention. In the embodiment, the first support wall 22 is a wall portion in the shape of a circular plate that extends in the circumferential direction in addition to the radial direction R. A through hole that penetrates the first support wall 22 in the axial direction L is formed in the center portion of the first support wall 22 in the radial direction R. A coupling member 47 that constitutes the intermediate shaft M is inserted through the through hole. The coupling member 47 is drivably coupled so as to rotate together with an input-side rotary member of the torque converter TC.

The first support wall 22 includes a first tubular projecting portion 23 that projects to the second axial direction L2 side. In the embodiment, the first tubular projecting portion 23 is disposed coaxially with the axis X at the center portion of the first support wall 22 in the radial direction R. The first tubular projecting portion 23 is a tubular portion (a boss portion) formed at a radially inward direction R1 side end portion of the first support wall 22 to project in the axial direction L. A cylindrical portion 47a of the coupling member 47 is disposed on the radially inward direction R1 side with respect to the first tubular projecting portion 23. In addition, the first support wall 22 includes a second tubular projecting portion 24 that is larger in diameter than the first tubular projecting portion 23. The second tubular projecting portion 24 is formed coaxially with the axis X to project to the second axial direction L2 side.

As illustrated in FIG. 2, two oil passages (a first supply oil passage A2 and a second supply oil passage A3) are formed inside the first support wall 22. The oil passages A2 and A3 are oil supply paths configured to supply oil, which is discharged by a hydraulic pump 56 (also see FIG. 1) and regulated to a predetermined hydraulic pressure by a first hydraulic control device 57 and the second hydraulic control device 58, to the friction engagement device CL. The oil passages A2 and A3 are formed in elevated portions 22a of the first support wall 22 that are elevated toward the second axial direction L2 side (see FIG. 6 etc.). In addition, the oil passages A2 and A3 are formed so as to extend along the radial direction R and the vertical direction (the up-down direction of FIG. 6). In the embodiment, the first supply oil passage A2 and the second supply oil passage A3 correspond to the "supply oil passage" according to the present invention.

The cover member 2c has a second support wall 27. The second support wall 27 is faulted to extend in the radial direction R on the second axial direction L2 side with respect to the rotary electric machine MG (in the example, at a location between the rotary electric machine MG and the damper 11 in the axial direction L). In the embodiment, the second support wall 27 is a wall portion in the shape of a circular plate that extends in the circumferential direction in addition to the radial direction R. A through hole that penetrates the second support wall 27 in the axial direction L is formed in the center portion of the second support wall 27 in the radial direction R. The input shaft I is inserted through the through hole.

The second support wall 27 is shaped to be offset in a stepwise manner in the axial direction L such that a radially inward direction R1 side portion of the second support wall 27 is positioned on the first axial direction L1 side with respect to a radially outward direction R2 side portion thereof as a whole. In addition, the second support wall 27 includes a tubular projecting portion 28 that projects to the first axial direction L1 side. In the embodiment, the tubular projecting portion 28 is disposed coaxially with the axis X at the center portion of the second support wall 27 in the radial direction R. The tubular projecting portion 28 is a tubular portion (a boss portion) which is formed at a radially inward direction R1 side end portion of the second support wall 27 and projects in the axial direction L. An axial projecting portion 38 of a plate-like support member 37 to be discussed later is disposed on the radially inward direction R1 side with respect to the tubular projecting portion 28.

As illustrated in FIG. 2, the rotary electric machine MG includes a stator St fixed to the case 2, and the rotor member 31. The stator St includes coil end portions Ce provided on both sides in the axial direction L. The rotor member 31 includes a rotor Ro and a rotor support member 32 that extends to the radially inward direction R1 side from the rotor Ro and supports the rotor Ro. The rotor Ro is disposed on the radially inward direction R1 side with respect to the stator St, and supported so as to be rotatable with respect to the case 2 via the rotor support member 32 which rotates together with the rotor Ro.

As illustrated in FIGS. 2 to 4, the rotor support member 32 includes a rotor holding portion 33 that holds the rotor Ro, and a radially extending portion 34. The rotor holding portion 33 is generally formed in the shape of a cylinder that has an outer peripheral portion that contacts the inner peripheral surface of the rotor Ro and flange portions that contact side surfaces of the rotor Ro in the axial direction L. The radially extending portion 34 is formed in the shape of an annular plate that extends to the radially inward direction R1 side from the rotor holding portion 33. The radially extending portion 34 includes a first axially projecting portion 35 that is tubular and that projects to the first axial direction L1 side, and a second axially projecting portion 36 that is tubular and that projects to the second axial direction L2 side. The first axially projecting portion 35 and the second axially projecting portion 36 are provided at a radially inward direction R1 side end portion of the radially extending portion 34.

The plate-like support member 37 which is in the shape of an annular plate is coupled so as to rotate together with the rotor support member 32. The plate-like support member 37 includes the axial projecting portion 38 which is tubular and which projects to the second axial direction L2 side from a radially inward direction R1 side end portion of the plate-like support member 37. The plate-like support member 37 is coupled to a second axial direction L2 side end portion of the rotor holding portion 33. Consequently, on the radially inward direction R1 side with respect to the rotor holding portion 33, a space is formed whose both sides in the axial direction L are defined by the radially extending portion 34 and the plate-like support member 37. The friction engagement device CL is disposed in the space.

As illustrated in FIGS. 2 to 4, a rotation sensor 51 is provided between the rotor support member 32 (radially extending portion 34) and the first support wall 22 in the axial direction L. The rotation sensor 51 is a sensor configured to detect rotation of the rotor Ro with respect to the stator St of the rotary electric machine MG. Here, the rotation sensor 51 detects the rotational position of the rotor Ro with respect to the stator St. In the example, a resolver is used as the rotation sensor 51. The rotation sensor 51 includes a sensor stator 52 and a sensor rotor 53. The sensor stator 52 is fixed to the second tubular projecting portion 24 of the first support wall 22 on the radially outward direction R2 side with respect to the first axially projecting portion 35. The sensor rotor 53 is disposed on the radially inward direction R1 side with respect to the sensor stator 52, and fixed to the outer peripheral surface of the first axially projecting portion 35.

The rotation sensor 51 is disposed on the radially inward direction R1 side with respect to the rotor Ro and at a position at which the rotation sensor 51 partially overlaps the rotor Ro as viewed in the radial direction R. The phrase "(two members) overlap as viewed in a certain direction" means that when an imaginary straight line parallel to the viewing direction is moved in each direction perpendicular to the imaginary straight line, a region where the imaginary straight line crosses both of the two members is present at least a part of the range where the imaginary straight line is moved. In the embodiment, the rotation sensor 51 is disposed such that the entire rotation sensor 51 (excluding a second terminal 54) overlaps the rotor Ro as viewed in the radial direction R.

The friction engagement device CL is a device provided between the input shaft I and the rotor member 31 on the power transfer path T and capable of varying the state of engagement. That is, the friction engagement device CL is configured to be capable of switching the state of engagement between two engagement members to be engaged by the friction engagement device CL between the engaged state and the disengaged state. When the friction engagement device CL is in the engaged state, a drive force is transferred between the input shaft I and the rotor member 31. When the friction engagement device CL is in the disengaged state, a drive force is not transferred between the input shaft I and the rotor member 31.

The friction engagement device CL is disposed between the radially extending portion 34 and the plate-like support member 37 in the axial direction L. In addition, the friction engagement device CL is disposed on the radially inward direction R1 side with respect to the rotor Ro and at a position at which the friction engagement device CL partially overlaps the rotor Ro as viewed in the radial direction R. In the embodiment, the friction engagement device CL is disposed such that the entire friction engagement device CL overlaps the rotor Ro as viewed in the radial direction R. In the embodiment, further, the entirety of the rotation sensor 51 (excluding the second terminal 54) and the friction engagement device CL is disposed to overlap the rotor Ro as viewed in the radial direction R.

The friction engagement device CL is constituted as a wet multi-plate clutch mechanism, and includes a clutch hub 41, friction members 42, a piston 43, a plate-like member 44, and an urging member 45. In the embodiment, the rotor holding portion 33 of the rotor support member 32 functions as a clutch drum. The clutch hub 41 is coupled to the input shaft I at the radially inward direction R1 side end portion, and supports a plurality of friction members 42 from the radially inward direction R1 side. In addition, a plurality of friction members 42 are supported by the rotor holding portion 33 from the radially outward direction R2 side.

As illustrated in FIG. 4, a working hydraulic pressure chamber H1 is formed as a space surrounded by the radially extending portion 34 and the second axially projecting portion 36 of the rotor support member 32 and the piston 43. In addition, a cancellation hydraulic pressure chamber H2 is formed as a space surrounded by the second axially projecting portion 36, the piston 43, and the plate-like member 44. The working hydraulic pressure chamber H1 and the cancellation hydraulic pressure chamber H2 are disposed across the piston 43 on both sides of the piston 43 in the axial direction L. In addition, a cooling oil chamber H3 is formed as a space between the plate-like member 44 and the plate-like support member 37 in the axial direction L. The clutch hub 41 and the friction members 42 are disposed in the cooling oil passage H3.

The urging member 45 is disposed between the piston 43 and the plate-like member 44. In the example, a helical spring is used as the urging member 45. A plate spring or the like may also be used as the urging member 45. The urging member 45 urges the piston 43 toward the side (in the example, the first axial direction L1 side) opposite to the side in which the friction members 42 are pressed in the axial direction L. That is, the urging member 45 according to the embodiment functions as a return spring. The state of engagement of the friction engagement device CL is controlled in accordance with the balance between the force for pressing the piston 43 to the second axial direction L2 side due to the hydraulic pressure in the working hydraulic pressure chamber H1 and the force for pressing the piston 43 to the first axial direction L1 side due to the hydraulic pressure in the cancellation hydraulic pressure chamber H2 and the urging member 45.

As illustrated in FIGS. 3 and 4, members that constitute the rotary electric machine MG and the friction engagement device CL and the input shaft I and the intermediate shaft M (coupling member 47) are supported in at least one of the radial direction R and the axial direction L by bearings 81 to 89. The rotor member 31 is supported in the radial direction R on the case 2 by the first bearing 81 and the second bearing 82 on both sides in the axial direction L with respect to the rotor Ro. Specifically, on the first axial direction L1 side with respect to the rotor Ro, the rotor support member 32 is supported on the first support wall 22 via the first bearing 81 disposed between the second tubular projecting portion 24 and the first axially projecting portion 35. On the second axial direction L2 side with respect to the rotor Ro, the plate-like support member 37 is supported on the second support wall 27 via the second bearing 82 disposed between the tubular projecting portion 28 and the axial projecting portion 38. In the example, ball bearings are used as the bearings 81 and 82.

In the embodiment, the rotor support member 32 is also supported in the radial direction R on the first support wall 22 by a sleeve member 97 disposed between the first tubular projecting portion 23 and the first axially projecting portion 35. The sleeve member 97 is provided to restrain flow of oil in the axial direction L through a gap between the first tubular projecting portion 23 and the first axially projecting portion 35.

The input shaft I is supported in the radial direction R on the axial projecting portion 38 of the plate-like support member 37 by the fifth bearing 85. The input shaft I is supported in the radial direction R on the second support wall 27 by the fifth bearing 85, the axial projecting portion 38, and the second bearing 82. The intermediate shaft M (coupling member 47) is supported in the radial direction R on the first tubular projecting portion 23 of the first support wall 22 by the third bearing 83 and the fourth bearing 84. In the example, needle bearings are used as the bearings 83 to 85.

The torque converter TC, the first support wall 22, the coupling member 47, the clutch hub 41 (a flange portion of the input shaft I), the plate-like support member 37, and the second support wall 27, which are arranged along the axial direction L, are supported in the axial direction L on each other by the bearings 81, 82, and 86 to 89. In the embodiment, the torque converter TC is supported in the axial direction L on the first support wall 22 from the first axial direction L1 side via the sixth bearing 86, and the coupling member 47 is supported in the axial direction L on the first support wall 22 from the second axial direction L2 side via the seventh bearing 87. The input shaft I is supported in the axial direction L on the coupling member 47 from the second axial direction L2 side via the eighth bearing 88. The plate-like support member 37 is supported in the axial direction L on the flange portion of the input shaft I from the second axial direction L2 side via the ninth bearing 89. In the example, thrust bearings are used as the bearings 86 to 89. The plate-like support member 37 is also supported in the axial direction L on the second support wall 27 via the first bearing 81. The rotor support member 32 is supported in the axial direction L on the first support wall 22 via the second bearing 82.

3. Structure for Supplying Oil to Friction Engagement Device and Rotary Electric Machine Next, the structure for supplying oil to the friction engagement device CL and the rotary electric machine MG will be described mainly with reference to FIGS. 2 to 4. The vehicle drive device 1 includes, as a hydraulic control device that controls a hydraulic pressure supplied from the hydraulic pump 56, the first hydraulic control device 57 and the second hydraulic control device 58 which are formed separately from each other. The first hydraulic control device 57 is fixed under the second case portion 2b in which the speed change mechanism TM (see FIG. 1) is housed. The second hydraulic control device 58 is disposed on the rotary electric machine MG side (the second axial direction L2 side) with respect to the first hydraulic control device 57. In the example, the second hydraulic control device 58 is fixed to the fixation portion 21a provided under the first case portion 2a. In the embodiment, the second hydraulic control device 58 corresponds to the "hydraulic control device" according to the present invention.

The first hydraulic control device 57 regulates the hydraulic pressure of oil supplied from the hydraulic pump 56 to mainly control a hydraulic pressure to be supplied to various components of the speed change mechanism TM and the torque converter TC. Oil from the first hydraulic control device 57 is also supplied to the second hydraulic control device 58 through a communication oil passage A1 formed across the second case portion 2b and the first case portion 2a. The first hydraulic control device 57 and the communication oil passage A1 which extends from the first hydraulic control device 57 function as an oil supply portion OS that supplies oil to the second hydraulic control device 58 from the speed change device SC side (the first axial direction L1 side) in the axial direction L. The second hydraulic control device 58 further regulates the hydraulic pressure of oil supplied from the first hydraulic control device 57 as necessary to control a hydraulic pressure to be supplied to various components of the friction engagement device CL and the rotary electric machine MG.

The first hydraulic control device 57 and the second hydraulic control device 58 each include a plurality of hydraulic control valves, and a valve body provided with oil passages that communicate with the hydraulic control valves. The hydraulic control valves include a discharge port that discharges (drains) oil, and adjust the discharge amount of oil to adjust a supplied hydraulic pressure. Oil discharged from the second hydraulic control device 58 is reserved in the second housing space S2 defined by the circumferential wall 21 and the second oil pan 13. The second housing space S2 functions as an oil reserving space. Oil discharged from the first hydraulic control device 57 is similarly reserved in a first oil pan (not illustrated) provided below the second case portion 2b. Oil returned after being supplied to various components of the vehicle drive device 1 is also reserved in the first oil pan.

Oil from the second hydraulic control device 58 is supplied to the friction engagement device CL through the two supply oil passages (the first supply oil passage A2 and the second supply oil passage A3) formed in the first support wall 22. The first supply oil passage A2 is an oil supply path configured to communicate with the working hydraulic pressure chamber H1 of the friction engagement device CL to supply oil for actuating the piston 43 to the working hydraulic pressure chamber H1. The first supply oil passage A2 is formed to extend to the radially inward direction R1 side (in the example, upward in the vertical direction) inside the first support wall 22, and thereafter extend to the second axial direction L2 side inside the first tubular projecting portion 23. The first supply oil passage A2 is blocked by a first blocking member 94 at a distal end portion of the first tubular projecting portion 23 on the second axial direction L2 side. As illustrated in FIG. 4, the first supply oil passage A2 communicates with the working hydraulic pressure chamber H1 via a first communication hole 23a formed in the first tubular projecting portion 23, a communication hole 97a formed in the sleeve member 97, and a first communication hole 32a formed in the rotor support member 32.

As illustrated in FIG. 4, the second supply oil passage A3 communicates with the cancellation hydraulic pressure chamber H2 and the cooling oil chamber H3 of the friction engagement device CL. The second supply oil passage A3 is an oil supply path configured to supply oil for canceling a centrifugal hydraulic pressure that acts on the piston 43 to the cancellation hydraulic pressure chamber H2, and to supply oil for cooling the friction members 42 to the cooling oil chamber H3. The second supply oil passage A3 is formed to extend to the radially inward direction R1 side at a position inside the first support wall 22 that is different from that of the first supply oil passage A2, and thereafter extend to the second axial direction L2 side at a position inside the first tubular projecting portion 23 that is different from that of the first supply oil passage A2. The second supply oil passage A3 is blocked by a second blocking member 95 at a distal end portion of the first tubular projecting portion 23 on the second axial direction L2 side.

The second supply oil passage A3 communicates with the cancellation hydraulic pressure chamber H2 via a second communication hole 23b formed in the first tubular projecting portion 23 and a second communication hole 32b formed in the rotor support member 32. Part of oil supplied to the cancellation hydraulic pressure chamber H2 through the second supply oil passage A3 is supplied to the cooling oil chamber H3 through a minute gap in the radial direction R between the second axially projecting portion 36 and the plate-like member 44. In addition, the second supply oil passage A3 communicates with the cooling oil chamber H3 via a third communication hole 23c formed in the first tubular projecting portion 23, a communication hole 47b formed in the coupling member 47, an in-shaft space 49, and a gap in the axial direction L between the input shaft I and the coupling member 47. Oil supplied to the cooling oil passage H3 through the second supply oil passage A3 is supplied to the friction members 42 disposed in the cooling oil chamber H3 to cool the friction members 42. In the embodiment, in order that the cooling efficiency is improved, a plurality of communication holes 41a in the radial direction R are formed in a cylindrical support portion of the clutch hub 41 to be arranged in the axial direction L. Oil supplied from the radially inward direction R1 side through the communication holes 41a cools the friction members 42 while flowing through spaces between the plurality of friction members 42.

In the embodiment, a cooling oil passage 39 configured to cool a stator coil (specifically, the coil end portions Ce) is formed between the rotor holding portion 33, which also functions as a clutch drum, and the rotor Ro. The cooling oil passage 39 is composed of a first radial oil passage 39a, an axial oil passage 39b, a second radial oil passage 39c, and a third radial oil passage 39d. Such oil passages are formed at a plurality of locations in the circumferential direction. The first radial oil passage 39a extends along the radial direction R inside the rotor holding portion 33 to communicate between the cooling oil chamber H3 and the axial oil passage 39b. The axial oil passage 39b extends along the axial direction L at a radially inward direction R1 side end portion of the rotor Ro to communicate with the second radial oil passage 39c and the third radial oil passage 39d on both ends in the axial direction L. The second radial oil passage 39c extends along the radial direction R at a rotor Ro side (the second axial direction L2 side) end portion of an end plate that holds the rotor Ro from the first axial direction L1 side to communicate with a space in which the stator St of the rotary electric machine MG is housed. The third radial oil passage 39d extends along the radial direction R at a rotor Ro side (the first axial direction L1 side) end portion of an end plate that holds the rotor Ro from the second axial direction L2 side to communicate with the space in which the stator St is housed (see FIG. 3).

As illustrated in FIG. 4, the second radial oil passage 39c is disposed at a position at which the second radial oil passage 39c overlaps the coil end portion Ce located on the first support wall 22 side (the first axial direction L1 side) as viewed in the radial direction R. As illustrated in FIG. 3, the third radial oil passage 39d is disposed at a position at which the third radial oil passage 39d overlaps the coil end portion Ce located the second support wall 27 side (the second axial direction L2 side) as viewed in the radial direction R. Oil that has cooled the friction members 42 flows through the first radial oil passage 39a, the axial oil passage 39b, and the second radial oil passage 39c in this order, and is supplied to the coil end portion Ce on the first support wall 22 side (the first axial direction L1 side) to cool the coil end portion Ce. In addition, oil that has cooled the friction members 42 flows through the first radial oil passage 39a, the axial oil passage 39b, and the third radial oil passage 39d in this order, and is supplied to the coil end portion Ce on the second support wall 27 side (the second axial direction L2 side) to cool the coil end portion Ce.

As illustrated in FIG. 4, the in-shaft space 49 communicates with the space in which the stator St is housed via a communication hole Ia formed in the input shaft I, a gap in the radial direction R between the input shaft I and the plate-like support member 37, and a gap in the axial direction L between the second support wall 27 and the plate-like support member 37. Part of oil led to the in-shaft space 49 through the second supply oil passage A3 passes through the flow path to be supplied to the coil end portion Ce on the second support wall 27 side (the second axial direction L2 side) while bypassing the cooling oil chamber H3, and then the oil cools the coil end portion Ce. Oil supplied from the second supply oil passage A3 also lubricates the bearings 81 to 89 before finally reaching the coil end portions Ce on both sides in the axial direction L. Oil having cooled the coil end portions Ce passes through a discharge oil passage A4 (see FIG. 2 etc.) formed across the second case portion 2b and the first case portion 2a to be returned to the first oil pan.

4. Structure for Electric Connection

Next, the structure for electric connection between the control device (not illustrated), which is provided external to the vehicle drive device 1 to control the vehicle drive device 1, and the stator St, the rotation sensor 51, and the second hydraulic control device 58 will be described mainly with respect to FIGS. 2 and 5 to 7. In the embodiment, such components are electrically connected to each other using the circumferential wall 21 and the first support wall 22 which constitute the first case portion 2a. The structure for electric connection will be described in detail below.

Figure 6:
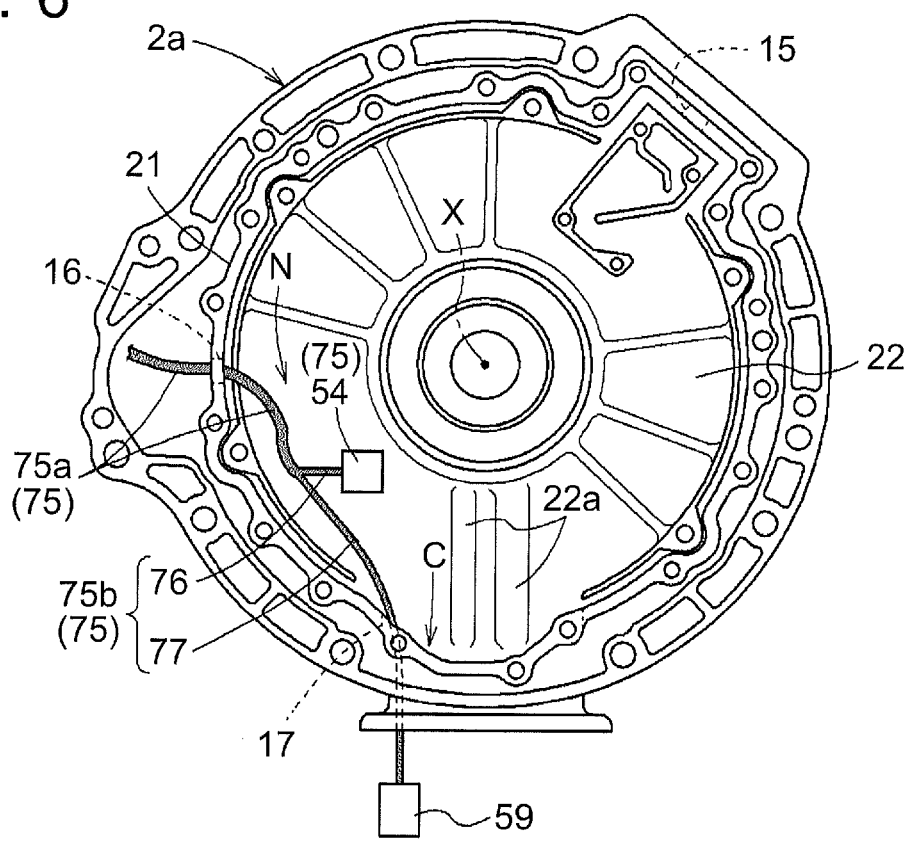
FIG. 6 is a front view of the first case portion.

As illustrated in FIGS. 2 and 6, the circumferential wall 21 has the first through hole 15 which penetrates the circumferential wall 21 in the radial direction R. As illustrated in FIG. 6, the first through hole 15 is formed above the axis X in the vertical direction at a position away from the uppermost portion of the circumferential wall 21. In the embodiment, the first through hole 15 is formed at a position of the circumferential wall 21 at which the direction from the axis X toward the first through hole 15 with respect to the vertically upward direction is about 20° to 40°. As illustrated in FIG. 2, a terminal block 61 is fixed to the first through hole 15 from the radially outward direction R2 side which is external to the vehicle drive device 1. In the embodiment, since the first through hole 15 is formed at a position away from the uppermost portion of the circumferential wall 21, the entirety including the terminal block 61 can be accommodated in the range occupied by the first case portion 2a in the vertical direction even in the case where the terminal block 61 is fixed to the first through hole 15. Hence, an increase in size of the entire vehicle drive device 1 can be suppressed.

The terminal block 61 is a relay member configured to connect the control device which is an external device to the stator coil (coil end portions Ce) of the stator St disposed in the case 2 (first case portion 2a). Specifically, the terminal block 61 connects a first external wiring member 71 that extends from the control device and a first wiring member 74 that extends from the coil end portion Ce across the circumferential wall 21. The terminal block 61 includes a main body portion 62 with insulation properties, a conductive connection member 63 held by the main body portion 62, and a first terminal 65 connected to the connection member 63 in the first case portion 2a. Connection members 63 and first terminals 65 are provided as many as the number of phases of the stator coil. Although the following description is made with focus on a specific phase, the same description also applies to the other phases. The terminal block 61 is fixed to the circumferential wall 21 with the connection member 63 inserted through the first through hole 15 and with the main body portion 62 contacting the outer peripheral surface of the circumferential wall 21. As illustrated in FIG. 2, the first through hole 15 and the terminal block 61 are disposed at a position at which the first through hole 15 and the terminal block 61 overlap the stator core of the stator St as viewed in the radial direction R.

The first terminal 65 of the terminal block 61 is formed by bending a flat plate member. The first terminal 65 has a first extension portion 65a and a second extension portion 65b delimited by the bent portion to extend toward both sides from the bent portion. In the example, the first terminal 65 is bent at a right angle so that the first extension portion 65a and the second extension portion 65b are orthogonal to each other.

The first extension portion 65a extends to the second support wall 27 side (the second axial direction L2 side) along the axial direction L from a radially inward direction R1 side end portion of the connection member 63. The second extension portion 65b extends to the radially inward direction R1 side along the radial direction R from the bent portion between the first extension portion 65a and the second extension portion 65b. The second extension portion 65b is disposed at a position at which the second extension portion 65b partially overlaps the coil end portion Ce on the second support wall 27 side (the second axial direction L2 side) as viewed in the radial direction R.

In the embodiment, a power line terminal (not illustrated) of the stator coil is present at the coil end portion Ce on the second axial direction L2 side. The first wiring member 74 extends to the radially outward direction R2 side along the radial direction R from the power line terminal. Power line terminals and first wiring members 74 are provided as many as the number of phases of the stator coil. Although the following description is made with focus on a specific phase, the same description also applies to the other phases. A fourth terminal 74a is provided at a radially outward direction R2 side end portion of the first wiring member 74. For each phase, the fourth terminal 74a of the first wiring member 74 and the second extension portion 65b of the first terminal 65 are disposed at a position at which the fourth terminal 74a and the second extension portion 65b overlap each other as viewed in the axial direction L. The fourth terminal 74a and the second extension portion 65b are connected to each other by a fastening bolt 79 inserted in the axial direction L. In the embodiment, the fastening bolt 79 corresponds to the "fastening member" according to the present invention.

In the embodiment, the fourth terminal 74a and the second extension portion 65b are connected to each other using the fastening bolt 79 with the first case portion 2a and the cover member 2c separated from each other. That is, the fastening bolt 79 is inserted from the opening portion 25 of the first case portion 2a on the second axial direction L2 side to connect the fourth terminal 74a and the second extension portion 65b to each other with the opening portion 25 not covered by the cover member 2c. After that, the cover member 2c is fixed to the first case portion 2a from the second axial direction L2 side.

In the embodiment, in which such a connection structure is adopted, the first wiring member 74 and the first terminal 65 of the terminal block 61 can be easily connected to each other using the opening portion 25 which is relatively large. That is, the control device and the stator coil can be easily electrically connected to each other. In addition, it is not necessary to provide a space for operating the fastening bolt 79 on the radially outward direction R2 side with respect to the circumferential wall 21. Hence, the vehicle drive device 1 can be mounted on the vehicle with a vehicle-side mounting member 99 (the vertically lower outer edge of the member is indicated by the thick dash-double-dot line in FIG. 2) such as a floor surface, for example, disposed adjacent to the vehicle drive device 1 on the radially outward direction R2 side (in particular, the upper side in the vertical direction) with respect to the case 2. Hence, it is possible to secure good mountability of the vehicle drive device 1 on the vehicle.

Figure 5:
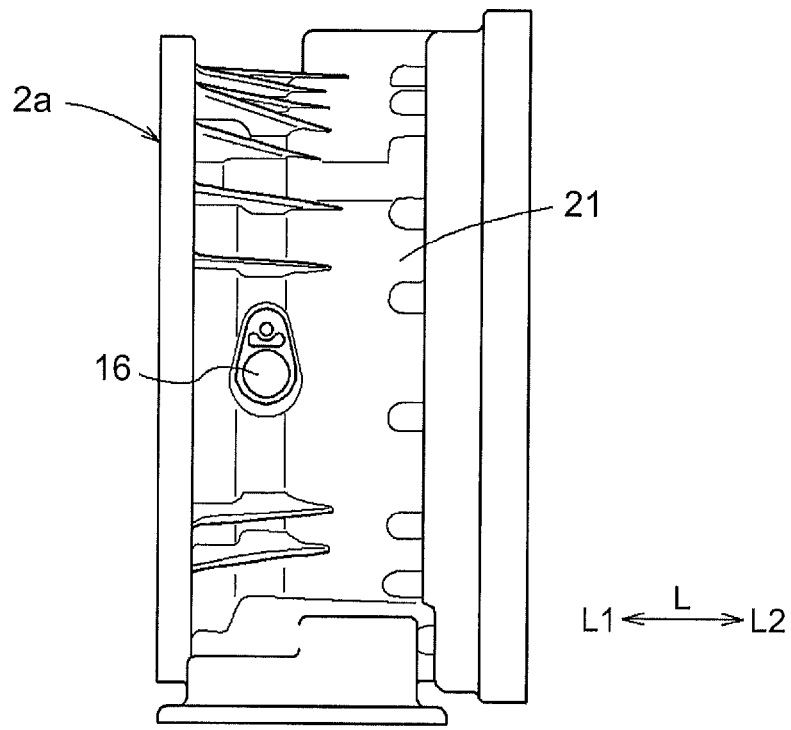
FIG. 5 is a side view of a first case portion.

In addition, as illustrated in FIGS. 5 and 6, the circumferential wall 21 has the second through hole 16 which penetrates the circumferential wall 21 in the radial direction R. The second through hole 16 is formed in a side portion of the circumferential wall 21, specifically at a position that is about the same position in the vertical direction as the axis X. Here, the second through hole 16 is formed at a position at which the second through hole 16 partially overlaps the axis X. In addition, with reference to FIG. 5, the second through hole 16 is formed in a portion of the circumferential wall 21 on the first support wall 22 side (the first axial direction L1 side) in the axial direction L. A second external wiring member (not illustrated) that extends from the control device is connected to a second wiring member 75 at a predetermined position before the second external wiring member 75 reaches the case 2 (first case portion 2a). The second wiring member 75 is introduced from the outside into the first case portion 2a (into the first housing space S1) through the second through hole 16. The second wiring member 75, which is fixed to the first support wall 22, is connected to the rotation sensor 51 and the second hydraulic control device 58.

The second wiring member 75 includes a first connection wiring portion 76 and a second connection wiring portion 77 branched from each other. Of the second wiring member 75, the first connection wiring portion 76 is a wiring portion that is connected to the rotation sensor 51, and the second connection wiring portion 77 is a wiring portion that is connected to the second hydraulic control device 58. The first connection wiring portion 76 and the second connection wiring portion 77 are constituted as wiring portions that are independent of each other. That is, the second wiring member 75 has a bound portion 75a in which the first connection wiring portion 76 and the second connection wiring portion 77 are bound to each other, and an unbound portion in which the first connection wiring portion 76 and the second connection wiring portion 77 are unbound from each other to be separated from each other. The second wiring member 75 passes through the second through hole 16 at the bound portion 75a to be introduced into the first case portion 2a. This makes the work of introducing the second wiring member 75 into the first case portion 2a relatively easy.

The second wiring member 75 is branched with the first connection wiring portion 76 and the second connection wiring portion 77 unbound from each other in the first case portion 2a (in the first housing space S1). The first connection wiring portion 76 is connected to the second terminal 54 of the rotation sensor 51. In the embodiment, in addition, as illustrated in FIG. 2, the communication hole 17 is formed in the lower portion of the circumferential wall 21. The communication hole 17 communicates between the first housing space S1 and the second housing space S2 in which the second hydraulic control device 58 is disposed. The communication hole 17 is provided for the purpose of suppressing a steep rise in hydraulic pressure in the second housing space S2 by feeding oil discharged (drained) from the second hydraulic control device 58 to the first housing space S1. The second connection wiring portion 77 is introduced from the first housing space S1 to the second housing space S2 using the communication hole 17, and connected to a third terminal 59 of the second hydraulic control device 58 in the second housing space S2.

Here, the first support wall 22 has the elevated portions 22a inside which the first supply oil passage A2 etc. is formed, and a plurality of rib portions provided to extend in the radial direction R for the purpose of improving the strength etc. (see FIG. 6). The second wiring member 75 is fixed to a region (non-formed region N) of the first support wall 22 in which the elevated portions 22a and the rib portions are not formed. The first supply oil passage A2 is formed inside the elevated portions 22a, and thus the first supply oil passage A2 is not formed in the non-formed region N. The non-formed region N is a flat plate-like portion of the first support wall 22 that is not elevated. The second wiring member 75 is fixed to the non-formed region N, and thus the second wiring member 75 is disposed at a position at which the second wiring member 75 overlaps the elevated portions 22*a* etc. as viewed in the circumferential direction. That is, the second wiring member 75 and the elevated portions 22*a* etc. are disposed at the same position (region) in the axial direction L. Hence, it is possible to suppress an increase in dimension in the axial direction L due to routing of the second wiring member 75 in the first case portion 2*a*. That is, an increase in size of the entire vehicle drive device 1 is effectively suppressed.

In addition, as illustrated in FIGS. 2 and 3, the communication hole 17 is formed on the opposite side (the second axial direction L2 side) of the fixation portion 21*a* of the circumferential wall 21 to which the second hydraulic control device 58 is fixed from the torque converter TC side in the axial direction L. As discussed above, oil is supplied to the second hydraulic control device 58 from the torque converter TC side (the first axial direction L1 side) by the oil supply portion OS. In view of this respect, by adopting the configuration described above, it is possible to provide the circumferential wall 21 with the communication hole 17 without hindering an appropriate arrangement of the first hydraulic control device 57 and the communication oil passage A1 which constitute the oil supply portion OS.

Figure 7:
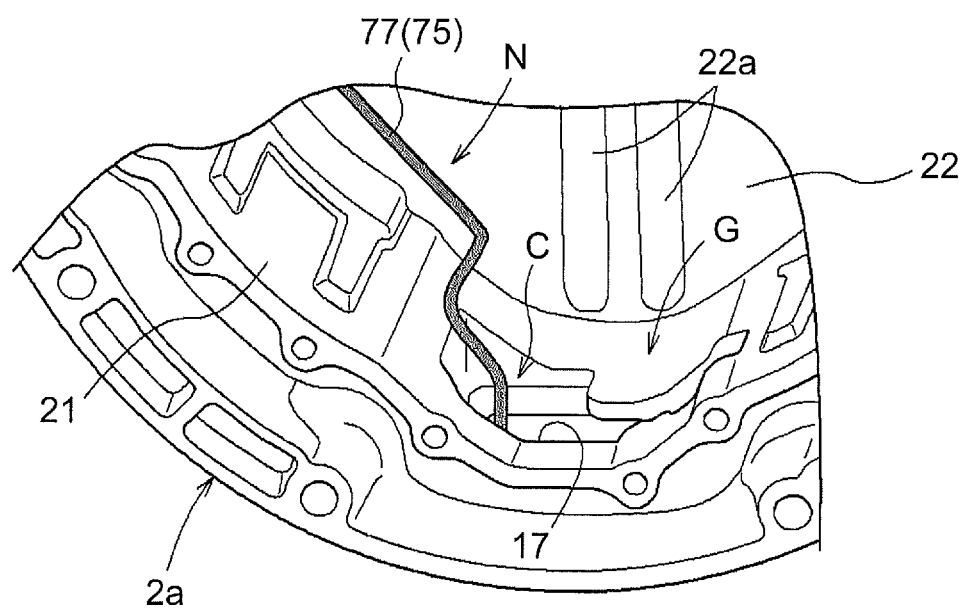
FIG. 7 is a partial perspective view of the first case portion.

As illustrated in FIG. 7, the communication hole 17 is formed as a relatively large hole portion that lies in the circumferential wall 21 over a predetermined range in the circumferential direction. In the example, the communication hole 17 is formed as a hole portion that lies over a range that is wider than the range occupied by the two elevated portions 22*a* formed on the first support wall 22 in the circumferential direction. The communication hole 17 is formed to include at least a range of the circumferential position on the second through hole 16 side with respect to the circumferential position at which the elevated portions 22*a* (first supply oil passage A2) are formed. This allows the second wiring member 75 (here, in particular, the second connection wiring portion 77), which is fixed to the first support wall 22 and extends toward the second hydraulic control device 58, to be led to the communication hole 17 without extending across the elevated portions 22*a*.

In the embodiment, further, as illustrated in FIGS. 2 and 7, the circumferential wall 21 is formed to have a radial gap G between the outer peripheral surface of the stator St and the circumferential wall 21 in a communication region C which is a circumferential region in which the communication hole 17 is formed. That is, the communication region C of the circumferential wall 21 is formed to project to the radially outward direction R2 side with respect to another region of the circumferential wall 21 (a region that contacts the outer peripheral surface of the stator St). The radial gap G formed on the radially inward direction R1 side with respect to such a projecting portion is a space having a circumferential width that is about the same as that of the communication hole 17 and having a length in the axial direction L that is about the same as that of the circumferential wall 21. That is, the radial gap G is a space that communicates with both the first support wall 22 and the communication hole 17. Therefore, the second connection wiring portion 77 can be led to the communication hole 17 by bending the second wiring member 75 (here, in particular, the second connection wiring portion 77) fixed to the first support wall 22 so as to extend along the axial direction L through the radial gap G (see FIG. 7). This allows the second connection wiring portion 77 to be appropriately introduced into the second housing space S2, and allows the second connection wiring portion 77 and the third terminal 59 of the second hydraulic control device 58 to be appropriately connected to each other. That is, the control device and the second hydraulic control device 58 can be appropriately electrically connected to each other.

According to the structure for electric connection discussed above, it is possible to achieve the vehicle drive device 1 in which the control device, which is an external device, and the stator St, the rotation sensor 51, and the second hydraulic control device 58 can be appropriately electrically connected, and to suppress an increase in overall size of the vehicle drive device 1.

5. Other Embodiments

Lastly, vehicle drive devices according to other embodiments of the present invention will be described. A configuration disclosed in each of the following embodiments may be applied in combination with a configuration disclosed in any other embodiment unless any contradiction occurs.

(1) In the embodiment described above, the second hydraulic control device 58 is fixed to the lower portion of the first case portion 2*a*. However, embodiments of the present invention are not limited thereto. The second hydraulic control device 58 may be fixed to a side portion of the first case portion 2*a*, such as at a position at which the second hydraulic control device 58 partially overlaps the axis X as viewed in the horizontal direction, for example.

(2) In the embodiment described above, the communication hole 17 is formed as a relatively large hole portion including at least a range of the circumferential position on the second through hole 16 side with respect to the circumferential position of the elevated portions 22*a* (first supply oil passage A2). However, embodiments of the present invention are not limited thereto. The communication hole 17 may be formed as a relatively small hole portion as long as the radial gap G described above in relation to the embodiment is formed between the circumferential wall 21 and the stator St because the second connection wiring portion 77 can be routed with a relatively high degree of freedom in the radial gap G. It is only necessary that the communication hole 17 should at least have such a size that there remains a gap that enables oil to flow from the second housing space S2 to the first housing space S1 around the second connection wiring portion 77 with the second connection wiring portion 77 inserted through the communication hole 17.

(3) In the embodiment described above, the second connection wiring portion 77 is introduced from the first housing space S1 to the second housing space S2 through the communication hole 17, and connected to the third terminal 59 of the second hydraulic control device 58 in the second housing space S2. However, embodiments of the present invention are not limited thereto. For example, the third terminal 59 of the second hydraulic control device 58 may extend from the second housing space S2 to the first housing space S1 through the communication hole 17 to be connected to the second connection wiring portion 77 in the first housing space S1.

(4) In the embodiment described above, the first case portion 2*a*, the second case portion 2*b*, and the cover member 2*c* are formed separately from each other, and the circumferential wall 21 and the first support wall 22 which constitute the first case portion 2*a* are formed integrally with each other. However, embodiments of the present invention are not limited thereto. For example, the first case portion 2*a* and the second case portion 2*b* may be formed integrally with each other, and the circumferential wall 21 and the first support wall 22 may be formed separately from each other. In the case where the circumferential wall 21 and the first support wall 22 are separate from each other, the first wiring member 74 may extend from the coil end portion Ce of the stator St on the first support wall 22 side (the first axial direction L1 side).

(5) In the embodiment described above, the first radial oil passage 39a which constitutes the cooling oil passage 39 is formed at only one location in the axial direction L. However, embodiments of the present invention are not limited thereto. A plurality of first radial oil passages 39a may be formed in the rotor holding portion 33 to be arranged in the axial direction L at positions at which the first radial oil passages 39a overlap the friction members 42 as viewed in the radial direction R.

(6) In the embodiment described above, the speed change device SC is configured to include the torque converter TC and the speed change mechanism TM. However, embodiments of the present invention are not limited thereto. For example, the speed change device SC may be configured to include only the speed change mechanism TM without including the torque converter TC. In addition, the speed change device SC may be configured to include a normal fluid coupling that does not have a torque amplifying function in place of the torque converter TC which has a torque amplifying function.

(7) In the embodiment described above, the vehicle drive device 1 has a single-axis configuration in which main components including the speed change mechanism TM are all disposed on the axis X. However, embodiments of the present invention are not limited thereto. For example, the vehicle drive device 1 may have a multi-axis configuration in which the speed change mechanism TM is disposed on an axis that is different from the axis X. The vehicle drive device 1 with such a configuration is suitably mounted on FF (Front-Engine Front-Drive) vehicles.

(8) Regarding other configurations, the embodiments disclosed herein are illustrative in all respects, and the present invention is not limited thereto. That is, a configuration not described in the claims of the present invention may be altered without departing from the object of the present invention.

INDUSTRIAL APPLICABILITY

The present invention may be suitably applied to a drive device for a one-motor parallel type hybrid vehicle.

DESCRIPTION OF THE REFERENCE NUMERALS

1 VEHICLE DRIVE DEVICE
2a FIRST CASE PORTION (HOUSING PORTION)
2c COVER MEMBER
15 FIRST THROUGH HOLE
16 SECOND THROUGH HOLE
17 COMMUNICATION HOLE
21 CIRCUMFERENTIAL WALL
21a FIXATION PORTION
22 FIRST SUPPORT WALL (SUPPORT WALL)
25 OPENING PORTION
51 ROTATION SENSOR
52 SENSOR STATOR
54 SECOND TERMINAL
58 SECOND HYDRAULIC CONTROL DEVICE (HYDRAULIC CONTROL DEVICE)
59 THIRD TERMINAL
61 TERMINAL BLOCK
65 FIRST TERMINAL
74 FIRST WIRING MEMBER
74a FOURTH TERMINAL
75 SECOND WIRING MEMBER
76 FIRST CONNECTION WIRING PORTION
77 SECOND CONNECTION WIRING PORTION
79 FASTENING BOLT (FASTENING MEMBER)
I INPUT SHAFT (INPUT MEMBER)
O OUTPUT SHAFT (OUTPUT MEMBER)
T POWER TRANSFER PATH
E INTERNAL COMBUSTION ENGINE
MG ROTARY ELECTRIC MACHINE
St STATOR
Ro ROTOR
Ce COIL END PORTION
CL FRICTION ENGAGEMENT DEVICE
SC SPEED CHANGE DEVICE
W WHEEL
S1 FIRST HOUSING SPACE
S2 SECOND HOUSING SPACE
N NON-FORMED REGION
C COMMUNICATION REGION
G RADIAL GAP
OS OIL SUPPLY PORTION
A2 FIRST SUPPLY OIL PASSAGE (SUPPLY OIL PASSAGE)
A3 SECOND SUPPLY OIL PASSAGE (SUPPLY OIL PASSAGE)

The invention claimed is:

1. A vehicle drive device in which a friction engagement device, a rotary electric machine, and a speed change device are provided on a power transfer path that connects between an input member drivably coupled to an internal combustion engine and an output member drivably coupled to wheels, the friction engagement device, the rotary electric machine, and the speed change device being arranged in this order from the input member side, comprising:
    a housing portion that has a circumferential wall that surrounds a radially outer side of the rotary electric machine and the friction engagement device, and a support wall that extends in a radial direction at a location between the rotary electric machine and the speed change device in an axial direction;
    a hydraulic control device fixed to the housing portion;
    a supply oil passage formed in the support wall to supply oil from the hydraulic control device to the friction engagement device; and
    a rotation sensor that has a sensor stator fixed to the support wall and that detects rotation of a rotor with respect to a stator of the rotary electric machine, wherein:
    the circumferential wall has a first through hole and a second through hole that penetrate the circumferential wall in the radial direction;
    a first wiring member that extends from the stator is connected to a first terminal of a terminal block provided in the first through hole;
    a second wiring member that extends into the housing portion from an outside through the second through hole is fixed to a non-formed region which is a region of the support wall in which the supply oil passage is not formed, and includes a first connection wiring portion and a second connection wiring portion branched from each other; and
    the first connection wiring portion is connected to a second terminal of the rotation sensor, and the second connection wiring portion is connected to a third terminal of the hydraulic control device.

2. The vehicle drive device according to claim 1, wherein:
    the housing portion has a first housing space formed on a radially inner side of the circumferential wall to house the rotary electric machine and the friction engagement device, a second housing space that houses the hydraulic control device, and a communication hole that communicates between the first housing space and the second housing space; and the second connection wiring portion is introduced from the first housing space to the second housing space through the communication hole to be connected to the third terminal in the second housing space.

3. The vehicle drive device according to claim 2, further comprising:

an oil supply portion that supplies oil to the hydraulic control device from the speed change device side in the axial direction, wherein:

the communication hole is formed on an opposite side of a fixation portion of the housing portion to which the hydraulic control device is fixed from the speed change device side in the axial direction; and the circumferential wall is formed to have a radial gap between an outer peripheral surface of the stator and the circumferential wall in a communication region which is a circumferential region in which the communication hole is formed.

\* \* \* \* \*